United States Patent
McDonald et al.

(10) Patent No.: US 8,451,433 B2
(45) Date of Patent: May 28, 2013

(54) RANGE-FINDING METHOD AND APPARATUS

(75) Inventors: Gregor John McDonald, Worcestershire (GB); Andrew Charles Lewin, Worcestershire (GB); David Arthur Orchard, Worcestershire (GB)

(73) Assignee: Qinetiq Limited, London (GB)

( * ) Notice: Subject to any disclaimer, the term of this patent is extended or adjusted under 35 U.S.C. 154(b) by 322 days.

(21) Appl. No.: 12/671,132

(22) PCT Filed: Aug. 6, 2008

(86) PCT No.: PCT/GB2008/002662
§ 371 (c)(1),
(2), (4) Date: Jan. 28, 2010

(87) PCT Pub. No.: WO2009/019468
PCT Pub. Date: Feb. 12, 2009

(65) Prior Publication Data
US 2010/0265491 A1    Oct. 21, 2010

(30) Foreign Application Priority Data
Aug. 7, 2007    (GB) .................................. 0715368.7

(51) Int. Cl.
*G01C 3/08*    (2006.01)
(52) U.S. Cl.
USPC .......... 356/5.09; 356/4.01; 356/5.01; 356/5.1
(58) Field of Classification Search
CPC ..................................... G01C 3/00; G01C 3/08
USPC .............. 356/3.01–28.5, 3.01–3.1, 4.01–4.1, 356/5.01–5.15, 6–22, 28
See application file for complete search history.

(56) References Cited

U.S. PATENT DOCUMENTS
4,320,397 A    3/1982    Constantinides et al.
4,447,149 A    5/1984    Marcus et al.
(Continued)

FOREIGN PATENT DOCUMENTS
DE    3142438 C1 *    2/1983
GB    180646    2/1923
(Continued)

OTHER PUBLICATIONS
International Search Report mailed on Nov. 11, 2008 in corresponding International Application No. PCT/GB208/002662.
(Continued)

*Primary Examiner* — Luke Ratcliffe
(74) *Attorney, Agent, or Firm* — Oliff & Berridge, PLC

(57) ABSTRACT

Range-finding apparatus comprises a source of pulsed radiation of variable repetition rate and a beam-splitter for dividing the pulsed radiation into two portions which are directed respectively to a local retro-reflector and to a retro-reflector co-located with a remote target the range of which is to be determined. The source, beam-splitter and retro-reflectors are arranged in the form of Michelson interferometer together with a detector. The repetition rate of the source is tuned to frequencies f such that round-trip distance to the remote target is mc/f where m is an integer, this condition being detected by observing a heterodyne signal at the detector. Two such frequencies enable range to be determined. The precision with which range is determined may be increased by carrying out interferometry using the two portions. The accuracy of the method does not depend on absolute range (as with triangulation) and is not limited by the speed of timing electronics, as is the case for time-of-flight techniques.

18 Claims, 2 Drawing Sheets

U.S. PATENT DOCUMENTS

| | | | |
|---|---|---|---|
| 4,770,526 | A | 9/1988 | Manhart et al. |
| 5,082,364 | A | 1/1992 | Russell |
| 5,489,984 | A | 2/1996 | Hariharan et al. |
| 5,510,809 | A | 4/1996 | Sakai et al. |
| 5,585,913 | A * | 12/1996 | Hariharan et al. ........... 356/4.09 |
| 6,246,468 | B1 | 6/2001 | Dimsdale |
| 6,469,778 | B2 | 10/2002 | Asaka et al. |
| 6,917,415 | B2 | 7/2005 | Gogolla et al. |
| 7,154,591 | B2 | 12/2006 | Muenter et al. |

FOREIGN PATENT DOCUMENTS

| | | | |
|---|---|---|---|
| GB | 2 241 399 A | | 8/1991 |
| WO | WO 2006/124063 A2 | | 11/2006 |

OTHER PUBLICATIONS

Written Opinion of the International Search Authority mailed on Nov. 11, 2008 in corresponding International Application No. PCT/GB2008/002662.

British Search Report conducted on Feb. 11, 2008 in corresponding British Patent Application No. 0715368.7.

International Preliminary Report on Patentability issued on Feb. 9, 2010 in corresponding International Application No. PCT/GB2008/002662.

* cited by examiner

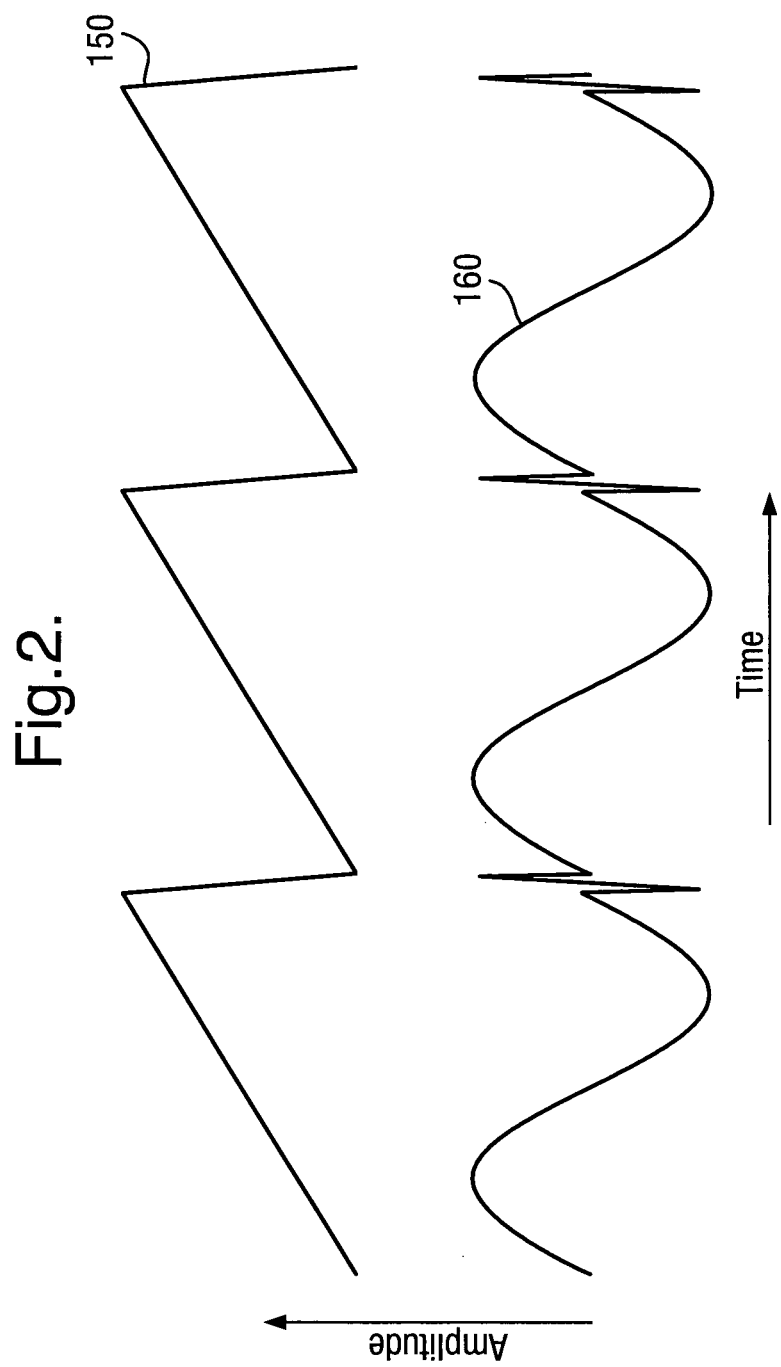

RANGE-FINDING METHOD AND APPARATUS

The invention relates to meteorological methods and apparatus, specifically to range-finding methods and apparatus.

Certain methods of range-finding involving use of electromagnetic radiation (e.g. optical, microwave and millimeter wave radiation) are known. For example, in triangulation metrology, a laser beam is used to illuminate a reference point located at an unknown target distance and diffuse or specular reflections from the reference point are focussed onto a detector which is laterally displaced from the laser beam. Range is determined from the angle between the laser beam and the reflected light received at the detector. However, because the fundamental measurement of the method is an angle measurement, range-accuracy decreases with increasing range.

Time-of-flight measurement using pulsed radiation is particularly useful for measuring large distances such as the Earth-Moon distance, which has been measured to an accuracy of a few centimeters. Ranges may be measured to an accuracy of a few millimeters. Time-correlated single-photon counting techniques can achieve accuracies on the order of 10 μm. In the simplest repetitively pulsed range-finding systems, the maximum range that can be unambiguously determined is limited by the pulse period T, although ranges greater than cT/2 may be measured by resolving range ambiguity, for example by varying T. Unlike triangulation, the range accuracy of these methods does not necessarily depend on absolute range, but is limited by the speed of timing circuitry used and signal-to-noise ratio (SNR), as well as pulse duration.

In a variant of the time-of-flight technique, a cw signal is modulated to produce a transmitted signal, and a return signal is compared to a portion of the transmitted signal. This technique transfers the measurement from the time domain to the frequency domain. Range is determined from the phase relationship between the portion of the transmitted signal and the return signal. Range resolution is limited by the accuracy of the phase measurement. This may be improved by using high modulation frequencies, although this reduces the range of unambiguous measurements.

Optical interferometry provides very high range resolution, i.e. less than an optical wavelength. A laser beam is divided into two beams, with one beam travelling a return path to a target and the other beam travelling a stable reference distance. The two beams are interfered to indicate the difference in optical path length traveled by the two beams. However, the absolute distance to the target remains unknown because it is impossible to determine how many whole wavelengths span the return path to the target. A dual wavelength interferometry approach can be used to extend the ambiguity range of an interferometer by generating a synthetic wavelength related to the beat frequency of two wavelengths. In practice, a range measurement within the unambiguous synthetic waveband is capable of achieving ranging accuracy in the range 100-1000 ppm. For example, use of a 3 GHz synthetic wavelength allows a ranging accuracy of 10-100 μm.

A first aspect of the invention provides range-finding method comprising the
steps of:
 (i) dividing a beam of pulsed radiation into first and second portions at a division point;
 (ii) directing the first portion from the division point to a remote target along a first path;
 (ii) directing the second portion from the division point to a local retro-reflector along a second path;
 (iii) adjusting the repetition rate of the beam of pulsed radiation to a first value $f_1$ such that pulses of radiation retro-reflected from the remote target spatially coincide at the division point with pulses of radiation reflected from the local retro-reflector;
 (iv) increasing or decreasing the repetition rate of the beam of pulsed radiation to a second such value $f_2$; and
 (v) finding the frequency difference$\pm(f_1-f_2)$ and hence the range of the remote target.

The invention provides accurate range measurement over large distances without limitations relating to the speed of timing circuitry associated with time-of-flight techniques.

Spatial coincidence of pulses retro-reflected from the remote target and from the local retro-reflector may observed by detecting amplitude fluctuations in the output of a detector arranged to detect the reflected pulses. However, more reliable detection of such coincidence may be achieved by phase-modulating one of said first and second portions (to frequency-shift that portion) and observing a heterodyne signal in the output of the detector, the heterodyne signal having a frequency substantially equal to the frequency shift produced by the phase modulation. Preferably the applied phase-modulation consists of a cyclical phase excursion in which phase increases substantially linearly with time in each cycle of the excursion so that the heterodyne signal has a substantially constant frequency, allowing simple detection of the heterodyne signal.

The range of the remote target may subsequently be determined to a fraction of a wavelength of the radiation by comparing the instantaneous phase of the phase-modulation signal to that of the heterodyne signal, thus utilising interference between radiation reflected from the remote target and from the local reflector to extract additional range information. For example, a signal corresponding to the instantaneous phase difference between the phase-modulation signal and the heterodyne signal may be obtained by frequency- or phase-demodulation. Although interference only occurs when radiation retro-reflected from the local reflector and the remote target overlap, the bandwidth of the detector need only be dimensioned to correspond to the rate of change of phase of the heterodyne signal. This allows use of a detector having a larger area than that of a typical high bandwidth detector used for temporally resolving ultra-short optical pulses, providing better light-gathering and SNR characteristics. Also, current detectors cannot adequately resolve pulses shorter than around 10-15 ps.

If the phase excursion is $2\pi N$ radians, where N is a positive integer, most of the interference pattern is concentrated in a signal having a frequency N times that of the phase-modulation signal.

The frequencies $f_1$ and $f_2$ may be found by cyclically tuning the repetition rate of the beam of pulsed radiation through a range of frequencies.

A second aspect of the invention provides range-finding apparatus comprising:
 (i) a source providing a beam of pulsed radiation of variable repetition rate;
 (ii) a local retro-reflector;
 (iii) means for dividing said beam into first and second portions at a division point;
 (iv) means for directing the first and second portions from the division point to the remote target, and to the local retro-reflector, respectively; and
 (v) detecting means for detecting spatial coincidence at the division point of pulses of radiation retro-reflected from the remote target and from the local retro-reflector.

To provide reliable detection of said spatial coincidence, preferably a phase-modulator is provided to phase-modulate either the first or the second portion in response to an input phase-modulation signal and the detecting means comprises means for detecting a heterodyne signal.

Embodiments of the invention are described below with reference to the accompanying drawings in which:

FIG. 2 shows the respective forms of a phase-modulation signal and a heterodyne signal in the FIG. 1 apparatus.

Figure 1:
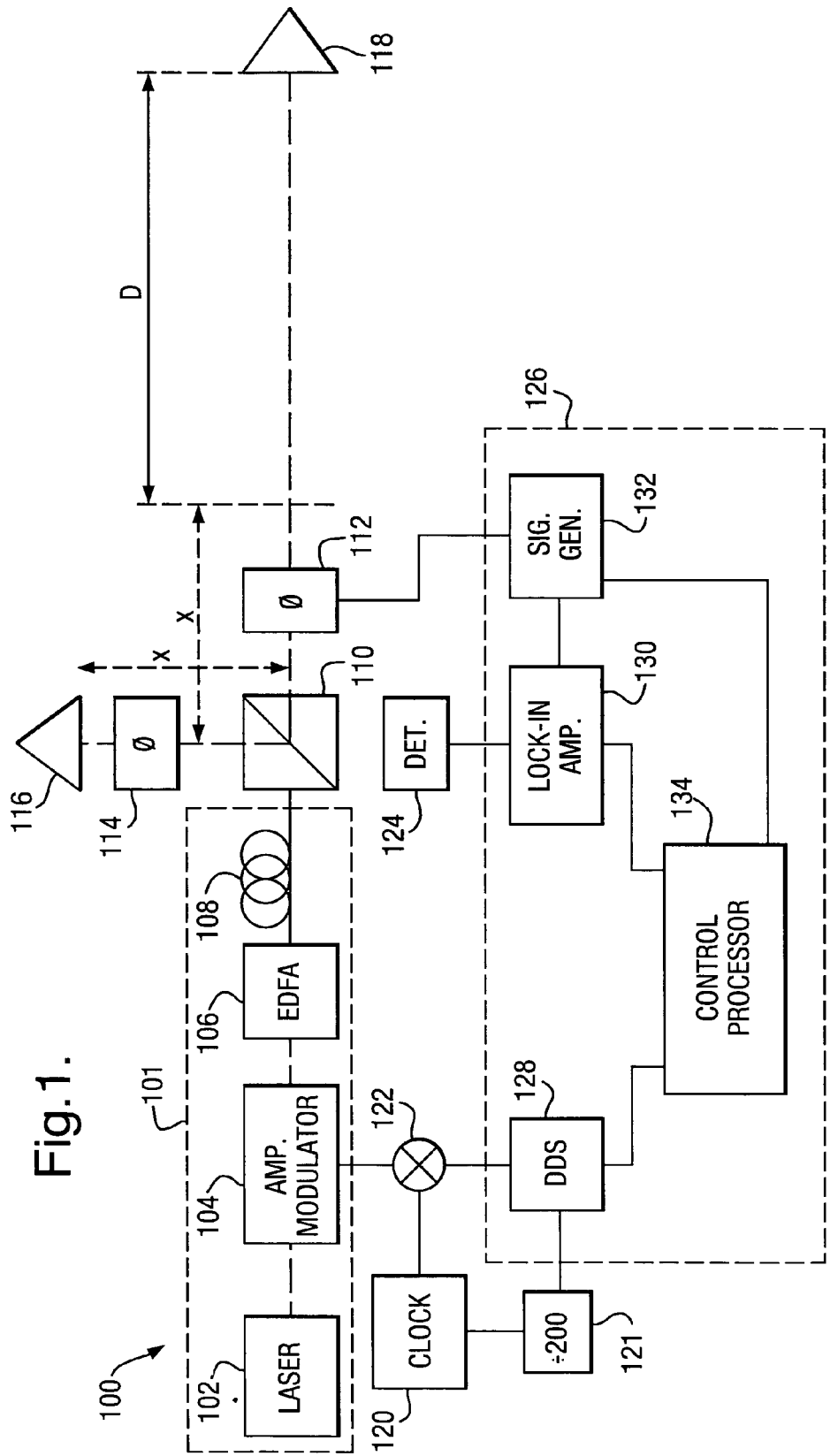
FIG. 1 shows a range-finding apparatus of the invention.

Referring to FIG. 1, a range-finding apparatus 100 of the invention comprises a source 101 of pulsed optical radiation, the repetition rate of which may be electronically tuned, a beam-splitter 110, phase-modulators 112, 114 and corner-cube reflectors 116, 118. Reflector 116 is a local retro-reflector; reflector 118 is co-located with a remote target, the range of which is to be determined. The apparatus 100 further comprises a photodetector 124, a rubidium standard 6.834 GHz reference clock 120, a single sideband mixer 122 and a field programmable gate array (FPGA) 126 arranged to implement a direct digital synthesiser (DDS) 128, a lock-in amplifier 130, a signal generator 132 and a control processor 134. The beam splitter 110, photodetector 124, phase modulators 112, 114 and corner-cube reflectors 116, 118 are arranged in the form of Michelson interferometer, one arm comprising the local corner-cube reflector 112 and having a physical length x, and the other arm comprising the corner-cube reflector 118 co-located with the remote target and having a physical length x+D. A frequency divider 121 provides a down-converted 300 MHz clock signal to the DDS 128.

The source 101 comprises a DFB laser 102, a GaAs amplitude-modulator 104, an erbium-doped fibre amplifier (EDFA) 106, an optical fibre 108, and a DC supply (not shown) arranged to apply a DC bias to the amplitude modulator 104. The optical fibre 108 may comprise a length of standard telecommunications fibre, or alternating lengths of standard telecommunications fibre and dispersion shifted fibre, or a length of dispersion decreasing fibre. The source 101 also comprises dithering means (not shown) arranged to dither the injection current of the DFB laser 102 so that its optical output is phase-modulated, and a step-recovery diode (not shown) arranged to pulse-pick optical pulses output from the optical fibre 108.

The modulation depth of the current dithering applied by the dithering means is small compared to the total injection current level in order to avoid variation in the output power of the DFB laser 102. Phase-modulated optical output from the DFB laser 102 passes to the amplitude modulator 104. Discrete optical pulses output from the amplitude-modulator 104 are amplified by the EDFA 106 and compressed by the optical fibre 108 by soliton-effect compression, which includes self-phase modulation (SPM). A step-recovery diode (not shown) is arranged to pulse-pick optical pulses emerging from the length 108 of optical fibre to produce a series of ultra-short optical pulses as the output of the source 101. The repetition frequency of the source 101 is tuned by tuning a control signal input to the amplitude modulator 104, the control signal being generated by mixing a signal from the clock 120 with a signal from the DDS 128 at the mixer 122. Optical pulses output from the EDFA 104 may be coupled into the fibre 108 via a circulator coupled to a Bragg grating and the optical fibre 108, in order to reduce the level of amplified spontaneous emission (originating in the EDFA 104) within the fibre 108.

To produce optical pulses at a repetition rate of the 3 GHz for example, the source 101 is operated as follows. The dithering means is adjusted so that optical output from the DFB laser 102 is phase-modulated at a frequency of 1.5 GHz. It is desirable that the modulation depth is no greater than is required to reduce stimulated Brillouin scattering (SBS) within the optical fibre 108 because a larger modulation depth tends to increase timing-jitter in the optical pulses output from the source 101. The frequency of the control signal input to the amplitude modulator is set at 3 GHz by suitable control of the DDS 128 so that optical output from the DFB laser 102 is modulated by the amplitude modulator 104 to produce a series of phase-modulated optical pulses having a repetition rate of 6 GHz. The DC bias input to the amplitude modulator 104 is adjusted to keep the modulator 104 biased at null in order to avoid positive and negative chirping of successive optical pulses output therefrom, which would result in non-identical successive optical pulses being output from the source 101. Phase-modulated optical pulses output from the amplitude-modulator 104 are amplified by the EDFA 106 and compressed by the optical fibre 108 by group velocity dispersion and SPM to produce pulses 10-15 ps in duration. The optical pulses output from the optical fibre 108 are pulsed-picked by the step-recovery diode (not shown) to remove every second pulse and hence produce a series of optical pulses having a repetition rate of 3 GHz. In this example, phase-modulation is carried out at exactly half the repetition frequency of the optical pulses output from the source 101 in order to achieve low phase-noise in the pulses, whilst SBS within the optical fibre 108 is avoided because the phase-modulation frequency is carried out at less than half the repetition frequency of the series of optical pulses entering the fibre 108.

Optical pulses from the source 101 pass to the beam-splitter 110 and are each divided into two portions. A first portion of a pulse passes through the phase modulator 112 to the corner-cube reflector 118 and is retro-reflected back to the beam-splitter 110. A second portion passes through the phase-modulator 114 to the local corner-cube reflector 116 and is retro-reflected back to the beam splitter 110. Radiation reflected from the corner-cube reflectors 116, 118 is detected at a single position by the photodetector 124. The paths of radiation reflected from the corner-cubes 116, 118 overlap from the beam splitter 110 to the detector 124.

Referring also to FIG. 2, the signal generator 132 applies a cyclical ramp signal 150 to the phase-modulator 112 to produce a frequency shift in the radiation which is reflected by the reflector 118. The phase-modulator 114 is not operated, but has the same structure as the phase-modulator 112 and is present to ensure that long-term drift in optical path length of the modulator 112 is also present in the modulator 114, so that such drift does not introduce a difference in the optical path lengths from the beam-splitter 110 to the respective reflectors 116, 118.

In operation of the apparatus 100, an output signal from the DDS 128 is read out under control of the processor 134 and mixed with a ~300 MHz signal generated by down conversion of the clock signal to produce a control signal which is input to the amplitude modulator 104. The signal output from the DDS 128 is cyclically ramped in frequency so that the repetition rate f of the source 101 is repeatedly tuned through a range of frequencies. When the repetition rate f of the source 101 is such that the round-trip distance 2D to the reflector 118 is an integer multiple of c/f, pulses reflected from the reflectors 116, 118 spatially coincide, this condition being detected by the presence of a heterodyne signal in the output of the detector 124; the heterodyne signal has a frequency equal to the frequency shift introduced by the phase modulator 112. The lock-in amplifier 130 provides detection of the heterodyne signal. Prior knowledge of an approximate value for D allows the range through which the repetition frequency of the source 101 needs to be scanned to be limited.

The rubidium standard clock 120 is a highly stable device and has a frequency known with a precision of 1 part in $10^{12}$. Since the input to the DDS 128 is derived from the clock 128, the frequencies output by the DDS 128, and hence the modulation frequencies input to the amplitude modulator, are also known very precisely. Knowledge of the repetition rate of the output of the source 101 is required to calculate the range of the remote target, so use of the clock 120 allows very accurate range measurement.

The DDS 128 is implemented on the FPGA 126 as an IP-core (available from Xilinx, Inc. for example). Alternatively a separate DDS chip may be used.

The control processor 134 is arranged to extract the instantaneous phase of the heterodyne signal by phase- or frequency-demodulation and to compare it to the instantaneous of phase of the signal output by the signal generator 132. The form of the phase of the heterodyne signal is indicated by 160 in FIG. 2. The phase difference between the heterodyne signal and the output of the signal generator 132 allows the range of the remote target to be determined to a fraction of an optical wavelength. A phase difference $\Delta\phi$ allows the round trip distance 2D to the remote target to be measured to an accuracy of $\lambda\Delta\phi/2\pi$, where $\lambda$ is the wavelength of radiation output by the source 101.

The step-recovery diode of the source 101 ensures the minimum possible timing jitter in the output of the source 101, and may be dispensed with depending on the accuracy with which D is to be measured.

The injection current of the laser 102 is dithered to provided line-broadening sufficient to avoid SBS in the fibre 108. This may also be achieved by use of separate phase-modulator disposed between the laser 102 and the amplitude modulator 104.

The invention claimed is:

1. A range-finding method comprising the steps of:
   (i) dividing a beam of pulsed radiation into first and second portions at a division point;
   (ii) directing the first portion from the division point to a remote target along a first path;
   (ii) directing the second portion from the division point to a local retro-reflector along a second path;
   (iii) adjusting the repetition rate of the beam of pulsed radiation to a first value f1 such that pulses of radiation retro-reflected from the remote target spatially coincide at the division point with pulses of radiation reflected from the local retro-reflector;
   (iv) increasing or decreasing the repetition rate of the beam of pulsed radiation to a second such value $f_2$; and
   (v) finding the frequency difference$\pm(f_1-f_2)$ and hence the range of the remote target.

2. A method according to claim 1 further comprising the steps of:
   (i) phase-modulating one of said first and second portions by means of a phase-modulation signal; and
   (ii) detecting spatial coincidence of pulses retro-reflected from the local retro-reflector and from the remote target by detection of a heterodyne signal.

3. A method according to claim 2 wherein the phase-modulation signal has a cyclical phase-excursion in which phase increases substantially linearly with time in each cycle of said excursion.

4. A method according to claim 3 further comprising the step of comparing the instantaneous phase of the phase-modulation signal to that of the heterodyne signal.

5. A method according to claim 4 wherein a signal corresponding to the instantaneous phase difference between the phase-modulation signal and the heterodyne signal is obtained by frequency- or phase-demodulation.

6. A method according to claim 4 wherein the phase excursion is substantially 2 $\pi$N radians, where N is a positive integer.

7. A method according to claim 1 comprising the step of cyclically tuning the repetition rate of the beam of the beam of pulsed radiation through a range of frequencies.

8. Range-finding apparatus comprising:
   (i) a source providing a beam of pulsed radiation of variable repetition rate;
   (ii) a local retro-reflector;
   (iii) means for dividing said beam into first and second portions at a division point;
   (iv) means for directing the first and second portions from the division point to the remote target, and to the local retro-reflector, respectively;
   (v) detecting means for detecting spatial coincidence at the division point of pulses of radiation retro-reflected from the remote target and from the local retro-reflector;
   (vi) means for adjusting the repetition rate of the beam of pulsed radiation to a first value $f_1$ such that pulses of radiation retro-reflected from the remote target spatially coincide at the division point with pulses of radiation reflected from the local retro-reflector; and for increasing or decreasing the repetition rate of the beam of pulsed radiation to a second such value $f_2$; and
   (vii) means for finding the frequency difference$\pm(f_1-f_2)$ and hence the range of the remote target.

9. Apparatus according to claim 8 further comprising a phase-modulator arranged to phase-modulate either said first or said second portion in response to an input phase-modulation signal and wherein the detecting means comprising means for detecting a heterodyne signal.

10. Apparatus according to claim 9 wherein the phase-modulation signal has a cyclical phase-excursion in which phase increases substantially linearly with time in each cycle of said excursion.

11. Apparatus according to claim 10 further comprising means arranged to compare the instantaneous phase of the phase-modulation signal to that of the heterodyne signal.

12. Apparatus according to claim 11 comprising means for generating a signal corresponding to the instantaneous phase difference between the phase-modulation signal and the heterodyne signal by frequency- or phase-demodulation.

13. Apparatus according to claim 11 wherein the phase-modulator is arranged to provide a phase excursion of 2 $\pi$N radians, where N is a positive integer.

14. Apparatus according to claim 8 further comprising means for repeatedly tuning the repetition rate of the beam of pulsed radiation through a range of frequencies.

15. A range-finding method comprising the steps of:
   (i) passing optical pulses from a source to a beam splitter arranged to divide each pulse into a first and second portions;
   (ii) directing the first portion to a retro-reflector on a remote target;
   (iii) directing the second portion to a local retro-reflector;
   (iv) detecting the retro-reflected portions at a single position using a photodetector,
   (v) adjusting the repetition rate of the beam of pulsed radiation to a first value $f_1$ such that the retro-reflected pulses of radiation are spatially coincident at the photodetector;
   (vi) increasing or decreasing the repetition rate of the beam of pulsed radiation to a second such value $f_2$; and (vii) finding the frequency difference$\pm(f_1-f_2)$ and hence the range of the remote target.

16. A method according to claim 15 further comprising the steps of:
(viii) phase-modulating one of said first and second portions by means of a phase-modulation signal; and
(ix) detecting spatial coincidence of pulses retro-reflected from the local retro-reflector and from the remote target by detection of a heterodyne signal.

17. A range-finding method comprising the steps of:
(i) dividing a beam of pulsed radiation into first and second portions at a division point;
(ii) directing the first portion from the division point to a remote target along a first path;
(ii) directing the second portion from the division point along a second path;
(iii) adjusting the repetition rate of the beam of pulsed radiation to a first value $f_1$ such that each pulse of radiation reflected from the remote target spatially coincides at a point with a pulse directed along the second path;
(iv) increasing or decreasing the repetition rate of the beam of pulsed radiation to a second such value $f_2$; and
(v) finding the frequency difference$\pm(f_1-f_2)$ and hence the range of the remote target.

18. Range-finding apparatus comprising:
(i) a source providing a beam of pulsed radiation of variable repetition rate;
(ii) means for dividing said beam into first and second portions at a division point;
(iii) means for directing the first and second portions from the division point to the remote target, and along a second path, respectively; and
(iv) detecting means for detecting spatial coincidence at a point in the apparatus of pulses of radiation reflected from the remote target and from the second path,
(v) means for adjusting the repetition rate of the beam of pulsed radiation to a first value $f_1$ such that pulses of radiation reflected from the remote target spatially coincide at a point with pulses of radiation reflected with a pulse directed along the second path, and for increasing or decreasing the repetition rate of the beam of pulsed radiation to a second such value $f_2$; and
(vi) means for finding the frequency difference$\pm(f_1-f_2)$ and hence the range of the remote target.

* * * * *